Aug. 13, 1935.  C. G. HOOVER  2,011,552
PNEUMATIC TIRE
Filed April 12, 1935
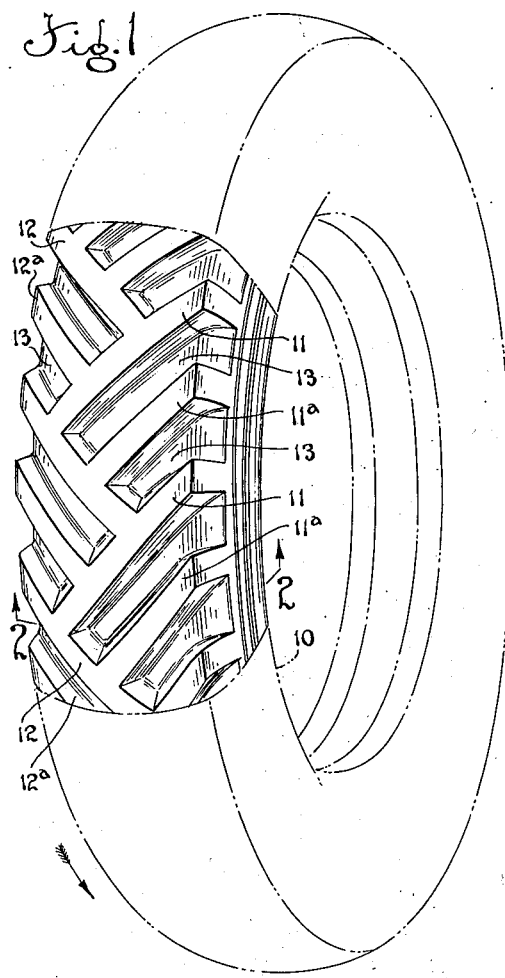
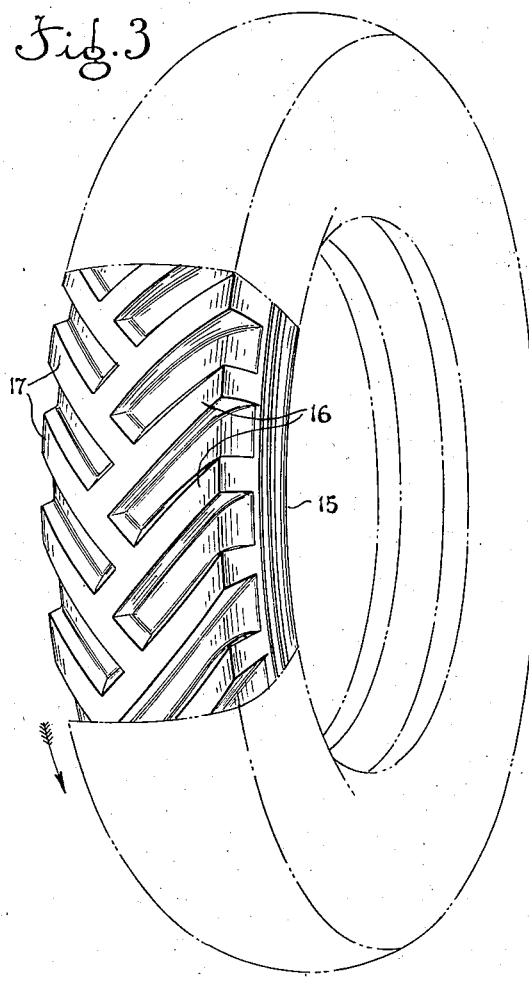
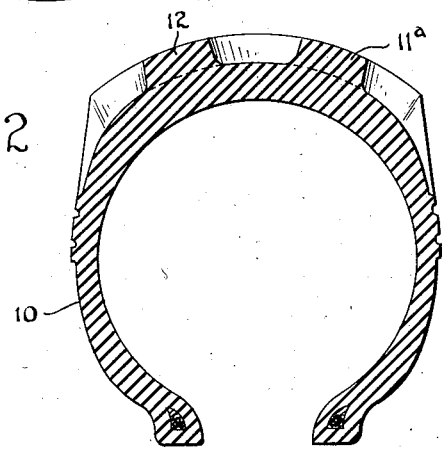
INVENTOR
Clair G. Hoover
Albert L. Ely
ATTORNEY Patented Aug. 13, 1935

2,011,552

UNITED STATES PATENT OFFICE 2,011,552

PNEUMATIC TIRE

Clair G. Hoover, Akron, Ohio, assignor to The Firestone Tire & Rubber Company, Akron, Ohio, a corporation of Ohio Application April 12, 1935, Serial No. 15,943

1 Claim. (Cl. 152—14)

This invention relates to pneumatic tires and more especially it relates to the tread configuration of pneumatic tire casings.

The tread designs of tire casings serve not only to distinguish the tires of one manufacturer from those of another, but have a utilitarian purpose such as providing traction with a roadway and preventing lateral and longitudinal skidding. Other factors involved are the elimination of traction noises and the problem of ejecting of mud or snow automatically from the grooves of the tread formation. The foregoing characteristics are achieved in a tread design having a chevron motif, that is, the design comprises ribs obliquely disposed with relation to the periphery of the tire, the ribs on one side of the centerline of the tire being disposed at an opposite angle to those on the opposite side thereof, said ribs intersecting each other along the centerline of the tire so as to define a series of V-shaped figures all lying in the same direction and having their outer ends disposed at the lateral margins of the tire tread. In practise, however, treads of this description are subject to a wiping action at the apexes of the V-shaped figures so that the latter wear relatively rapidly at this point, and it is to the relief of this condition that this invention primarily is directed.

The chief object of the invention is to provide an improved tire tread of the chevron motif in which wiping action on the tread characters is obviated, without sacrifice of the other desirable features of the tread design. Other objects will be manifest as the specification proceeds.

Of the accompanying drawing:

Figure 1 is a fragmentary perspective view of a tire embodying the invention in its preferred form;

Figure 2 is a section on the line 2—2 of Figure 1; and

Figure 3 is a fragmentary perspective view of a tire constituting another embodiment of the invention.

Referring to the drawing, 10 is a pneumatic tire casing of any known or preferred structural design. The tread portion of the tire 10 is formed with a circumferential series of obliquely disposed, spaced ribs or bars 11, 11a, the outer ends of which are disposed at one lateral margin of the tire tread, and a similar series of obliquely disposed ribs or bars 12, 12a, the outer ends of which are disposed at the other lateral margin of the tread. It will be seen from reference to Figure 1 that the ribs 11 are longer than the ribs 11a, and that said ribs are arranged in alternation about the tire. The ribs 12, 12a are similarly of different length and are similarly arranged in alternation. All of said ribs are shorter than the distance across the tire and their angularity is such that they intersect each other substantially at right angles in the medial region of the tread. The ribs are so disposed that each rib 11 and rib 11a has its inner end joined to a rib 12 intermediate the ends of the latter, and each rib 12 and rib 12a has its inner end joined to a rib 11 intermediate the latter's ends. The arrangement is such that there are no exposed rib-ends in the medial portion of the tire tread to be subjected to wiping action during use, and each rib terminates at its outer end at the margin of the tread. The tread-ribs define intervening spaces or grooves 13, 13, each of which is obliquely disposed with relation to the periphery of the tire, and extends from the medial portion of the tread to one of the lateral margins thereof, there being no completely enclosed depressions in the tread. The feature of having every rib terminate at the side of the tread lessens the destructive effect of the "traction wave" set up in a tire when in use.

The tire is intended to be so mounted upon a vehicle that it rotates in the direction indicated by the arrow when the vehicle is moving forwardly, with the result that any mud or snow in the grooves 13 is urged toward the open ends of said grooves, at the margins of the tread, and ejected therefrom. Experience has shown that the arrangement whereby the grooves in the tread automatically are cleaned imparts superior traction characteristic to the tire.

Referring now to the embodiment of the invention shown in Figure 3, 15 denotes a pneumatic tire casing, the tread portion of which is formed with a circumferential series of obliquely disposed bars or ribs 16, 16, the outer ends of which extend to one lateral margin of the tire tread, and an exactly similar series of obliquely disposed ribs 17, 17, the outer ends of which extend to the opposite lateral margin of the tread. The ribs 16, 17 are of the same length, and are so angularly disposed that the ribs on one side of the tread intersect the ribs on the other side thereof substantially at right angles near the middle of the tread. The arrangement is such that the inner end of each rib 16 intersects a rib 17 intermediate the ends of the latter, and each rib 17 intersects a rib 16 intermediate the latter's ends. Otherwise the tire shown in Figure 3 is identical with that shown in Figure 1, and operates in the same manner and possesses substantially all the advantages of the latter.

It will be observed that in each of the examples of the invention, the main diagonal ribs 11 and 12 in Figure 1 and the ribs 16 and 17 in Figure 3 extend so that they intersect with the oppositely directed ribs beyond the center line of the tread. The intermediate grooves thus extend across the center line of the tire, each groove extending beyond the ends of the next adjacent grooves, so that the tread surface is broken up and no central rib is formed. In prior art pneumatic tires, it has been the general practice to provide an unbroken, so-called "riding strip" down the immediate center line of the tire or at the sides thereof, and while this construction may be desirable upon paved surfaces, for the particular and especial service for which this tire is designed the elimination of a central riding strip is an important element in securing adequate traction. The present design of pneumatic tire tread has been particularly intended and adapted for service on tractors or other farm vehicles which operate upon soft and slippery ground and under the most adverse conditions where traction is hard to secure and at the same time will operate efficiently when the vehicle is run over paved surfaces. By breaking up any continuous riding surface the tendency of the tire to slip is greatly reduced.

In addition, the formation of the diagonal grooves which are unobstructed from the center of the tread to the side walls permits the accumulation of mud or the like to work out laterally so that the tire will clean itself. As the grooves extend only in the tread, they are not so deep that they will permit the mud to cake therein. Tread designs which contain pockets or obstructions in the grooves or have transverse grooves quickly fill up with cakes of mud and the smooth, slippery surface which is thus produced loses all traction.

The combination of the various elements which have been described make a tread surface for pneumatic tires which is superior to older tread designs for use in mud or clay surfaces where traction cannot be maintained with previous tread designs.

Other modification may be resorted to without departing from the spirit of the invention or the scope of the appended claim.

What is claimed is:

A pneumatic tire having a tread portion comprising sets of parallel ribs upon opposite sides of the tread and positioned in opposite diagonal relation to the center line of the tire to form a repetition of V-shaped formations about the tire, the apices of the formations being alternated on opposite sides of the center line of the tire, each rib being extended to connect with an oppositely directed rib to prevent wiping at the apex, the grooves between parallel ribs being located in the tread portion only and being unobstructed to permit discharge of accumulations of mud laterally to the sides of the tire, and at least some of said grooves extending from the edges of the tread to points beyond the center line of the tire and beyond the ends of the grooves extending from the opposite direction so that a continuous, straight, central rib about the tire is avoided.

CLAIR G. HOOVER.